(12) United States Patent
Lamgaday et al.

(10) Patent No.: US 10,315,470 B2
(45) Date of Patent: *Jun. 11, 2019

(54) AIR MAINTENANCE TIRE AND VALVE ASSEMBLY AND METHOD

(71) Applicant: The Goodyear Tire & Rubber Company, Akron, OH (US)

(72) Inventors: Robin Lamgaday, Wadsworth, OH (US); Robert Leon Benedict, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/370,036

(22) Filed: Dec. 6, 2016

(65) Prior Publication Data

US 2018/0154710 A1    Jun. 7, 2018

(51) Int. Cl.
  *B60C 23/12*  (2006.01)

(52) U.S. Cl.
  CPC ................................ *B60C 23/12* (2013.01)

(58) Field of Classification Search
  CPC ............................. B60C 23/10; B60C 23/12
  See application file for complete search history.

(56) References Cited

U.S. PATENT DOCUMENTS

| | | |
|---|---|---|
| 1,050,886 A | 1/1913 | Wetherell |
| 1,134,361 A | 4/1915 | Wetherell |
| 3,304,981 A | 2/1967 | Sheppard |
| 3,833,041 A | 9/1974 | Glad et al. |
| 4,922,984 A | 5/1990 | Dosjoub et al. |

(Continued)

FOREIGN PATENT DOCUMENTS

| | | |
|---|---|---|
| DE | 3433318 | 3/1986 |
| RU | 2106978 | 3/1998 |

(Continued)

OTHER PUBLICATIONS

European Search Report dated Mar. 27, 2018 for Application Serial No. EP17205212.

*Primary Examiner* — Jason R Bellinger
(74) *Attorney, Agent, or Firm* — Robert N. Lipcsik

(57) ABSTRACT

An air maintenance tire assembly includes a tire having a tire cavity bounded by first and second sidewalls extending to a tire tread region, a pressure control assembly attached to an elongate valve stem projecting from a rim, the pressure control assembly being external to the tire cavity, the elongate valve stem projecting outward from the tire cavity and operative to admit pressurized air into the tire cavity through the pressure control assembly, the first sidewall having an annular sidewall air passageway therein operatively located to compress segment by segment responsive to a bending strain introduced into the first sidewall from a rolling tire footprint thereby forcing air, segment by segment, along the annular air passageway, a tube housing joining both ends of the annular air passageway, and a connecting tube extending from the tube housing to the pressure control assembly, the connecting tube operative to sequentially direct air forced along the air passageway, first, into the tube housing, the pressure control assembly and, then, into the elongate valve stem as the tire rolls over a ground surface.

13 Claims, 5 Drawing Sheets

(56) References Cited

U.S. PATENT DOCUMENTS

| | | |
|---|---|---|
| 5,052,456 A | 10/1991 | Dosjoub |
| 5,558,730 A | 9/1996 | Olney |
| 6,772,812 B1 | 8/2004 | Hamilton |
| 7,117,731 B2 | 10/2006 | Hrabal |
| 7,117,910 B2 | 10/2006 | Akahori |
| 8,042,586 B2 | 10/2011 | Losey et al. |
| 8,113,254 B2 | 2/2012 | Benedict |
| 8,573,270 B2 * | 11/2013 | Hinque .................. B60C 23/12 152/419 |
| 9,272,586 B2 | 3/2016 | Durr |
| 9,415,640 B2 * | 8/2016 | Lin ........................ B60C 23/12 |
| 9,533,534 B2 * | 1/2017 | Lamgaday .............. B60C 23/12 |
| 9,796,222 B2 | 10/2017 | Lin |
| 2009/0294006 A1 | 12/2009 | Hrabal |
| 2016/0114635 A1 | 4/2016 | Lamgaday |
| 2017/0144492 A1 * | 5/2017 | Lamgaday .............. B60C 23/12 |

FOREIGN PATENT DOCUMENTS

| | | |
|---|---|---|
| SE | 183890 | 5/1963 |
| WO | WO2003049958 | 6/2003 |
| WO | WO2005012009 A1 | 7/2004 |
| WO | 2007134556 | 11/2007 |
| WO | WO2010008338 A1 | 1/2010 |

* cited by examiner

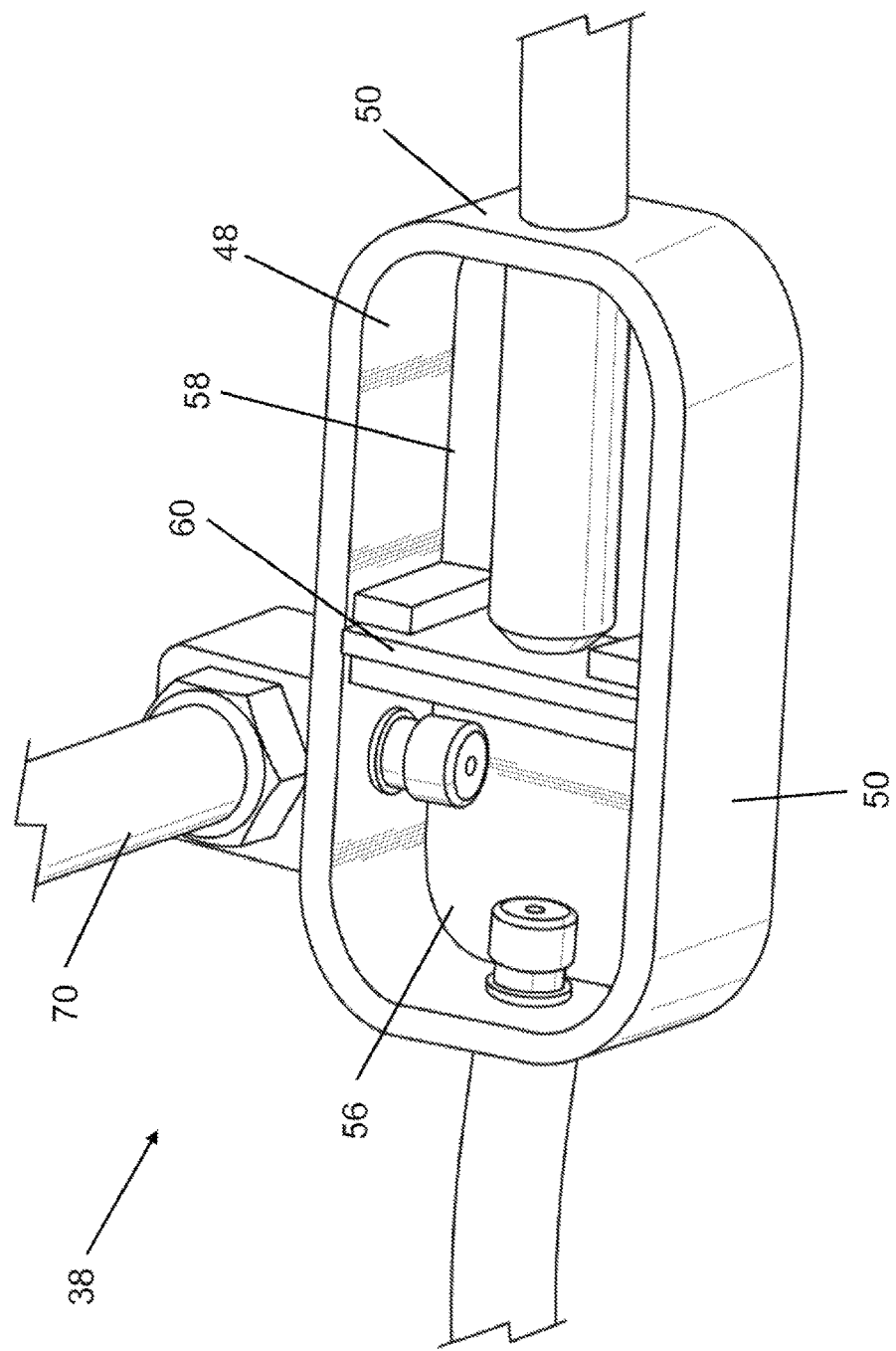

AIR MAINTENANCE TIRE AND VALVE ASSEMBLY AND METHOD

FIELD OF THE INVENTION

The present invention relates generally to air maintenance tires and, more specifically, to a tire assembly incorporating an air pumping mechanism into a tire for maintaining tire air pressure.

BACKGROUND OF THE PRESENT INVENTION

Normal air diffusion reduces tire pressure over time. The natural state of tires is underinflated. Accordingly, drivers must repeatedly act to maintain tire pressures or will incur reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

An air maintenance tire assembly in accordance with the present invention includes a tire having a tire cavity bounded by first and second sidewalls extending to a tire tread region, a pressure control assembly attached to an elongate valve stem projecting from a wheel, the pressure control assembly being external to the tire cavity, the elongate valve stem projecting outward from the tire cavity and operative to admit pressurized air into the tire cavity through the pressure control assembly, the first sidewall having an annular sidewall air passageway therein operatively located to compress segment by segment responsive to a bending strain introduced into the first sidewall from a rolling tire footprint thereby forcing air, segment by segment, along the annular air passageway, a tube housing joining both ends of the annular air passageway, and a connecting tube extending from the tube housing to the pressure control assembly, the connecting tube operative to sequentially direct air forced along the air passageway, first, into the tube housing, the pressure control assembly and, then, into the elongate valve stem as the tire rolls over a ground surface.

According to another aspect of the tire assembly, the tube housing includes a plurality of planar sides defining an internal chamber.

According to still another aspect of the tire assembly, the internal chamber is bifurcated by an internal wall of the tube housing to define a first internal chamber and a second internal chamber.

According to yet another aspect of the tire assembly, the first internal chamber receives ambient air through the elongate valve stem and a porous filter component and directs the ambient air into one end of the annular air passageway.

According to still another aspect of the tire assembly, the second internal chamber receives pressurized air from a second end of the annular air passageway.

According to yet another aspect of the tire assembly, the second internal chamber directs air to the tire cavity through the connecting tube, the pressure control assembly, and the elongate valve stem.

According to still another aspect of the tire assembly, the pressure control assembly includes a relief valve for relieving pressure in the valve housing above a set pressure.

According to yet another aspect of the tire assembly, the connecting tube is coupled in air flow communication with the air passageway and the valve stem.

According to still another aspect of the tire assembly, a first valve for enabling and disabling a flow of pressurized air into the connecting tube from the air passageway.

According to yet another aspect of the tire assembly, the first valve includes a one-way valve housed within the tube housing.

A method in accordance with the present invention maintains air within a tire. The method includes the steps of: positioning within a sidewall an annular air passageway, the tire having an elongate valve stem projecting outward from a tire cavity; locating the annular air passageway to compress, segment by segment, responsive to a bending strain introduced into a sidewall from a rolling tire footprint of the tire thereby forcing air, segment by segment, along the annular air passageway; and extending a connecting tube between a tube housing connecting both ends of the annular air passageway and a pressure control assembly threadedly attached to the valve stem, the connecting tube and tube housing operative to sequentially direct air forced along the annular air passageway, first, into the pressure control assembly and then the valve stem and tire cavity as the tire rolls over a ground surface.

According to another aspect of the method, a further step deploys the annular air passageway as an air tube within a groove formed within the sidewall.

According to still another aspect of the method, further steps position a first valve operative to enable and disable a flow of pressurized air into the connecting tube from the tube housing and position a second valve operative to enable and disable a flow of pressurized air from the second valve into the tire cavity.

According to yet another aspect of the method, further steps deploy the air tube and the sidewall groove in a substantially annular configuration and position the tube housing within the sidewall proximate to the valve stem.

According to still another aspect of the method, a further step defines an internal chamber of the tube housing with a plurality of planar sides.

According to yet another aspect of the method, further steps bifurcate the internal chamber with an internal wall of the tube housing and define a first internal chamber and a second internal chamber.

According to still another aspect of the method, further steps receive ambient air into the first internal chamber through a porous filter component and direct the ambient air into one end of the annular air passageway.

According to yet another aspect of the method, a further step receives pressurized air into the second internal chamber from a second end of the annular air passageway.

According to still another aspect of the method, a further step directs air to the tire cavity through the connecting tube, the pressure control assembly, and the elongate valve stem.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the wheel and distribute the flexing above the wheel.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane (CP).

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which:

FIG. 5 is a detailed perspective view of an example filter housing in accordance the present invention.

DESCRIPTION OF EXAMPLES OF THE PRESENT INVENTION

Figure 1:
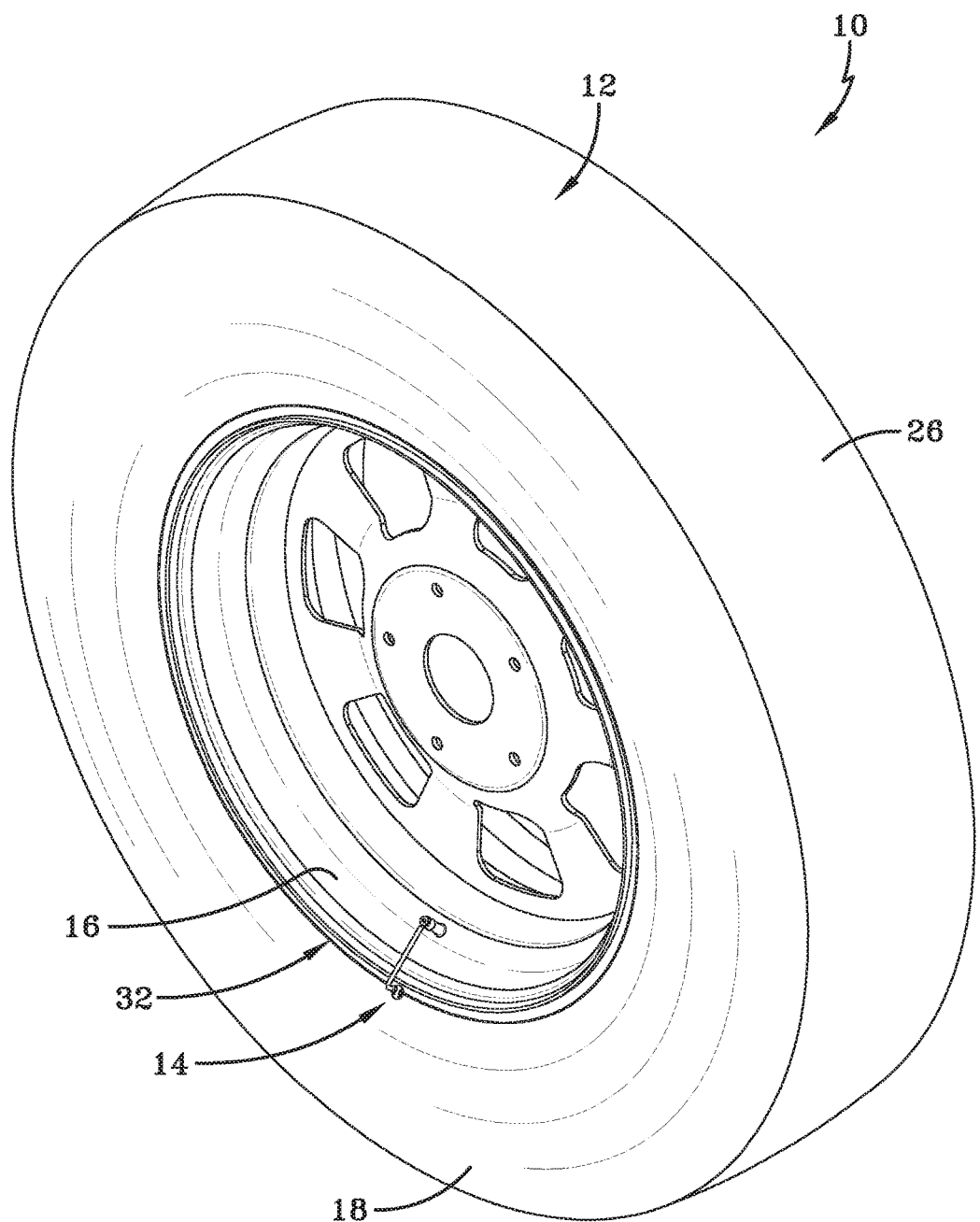
FIG. 1 is a perspective view showing a tire, tube, and pump location for use with the present invention.

Referring to FIGS. 1, 2, 3 and 4, an example tire assembly 10 may include a tire 12, a peristaltic pump assembly 14 and a wheel 16. The tire 12 may mount in conventional fashion to the wheel 16. The tire 12 may be of conventional construction, having a pair of sidewalls 18 extending from opposite bead areas 22 to a crown or tire tread region 26. The tire 12 and wheel 16 may enclose a tire cavity 28.

Figure 2:
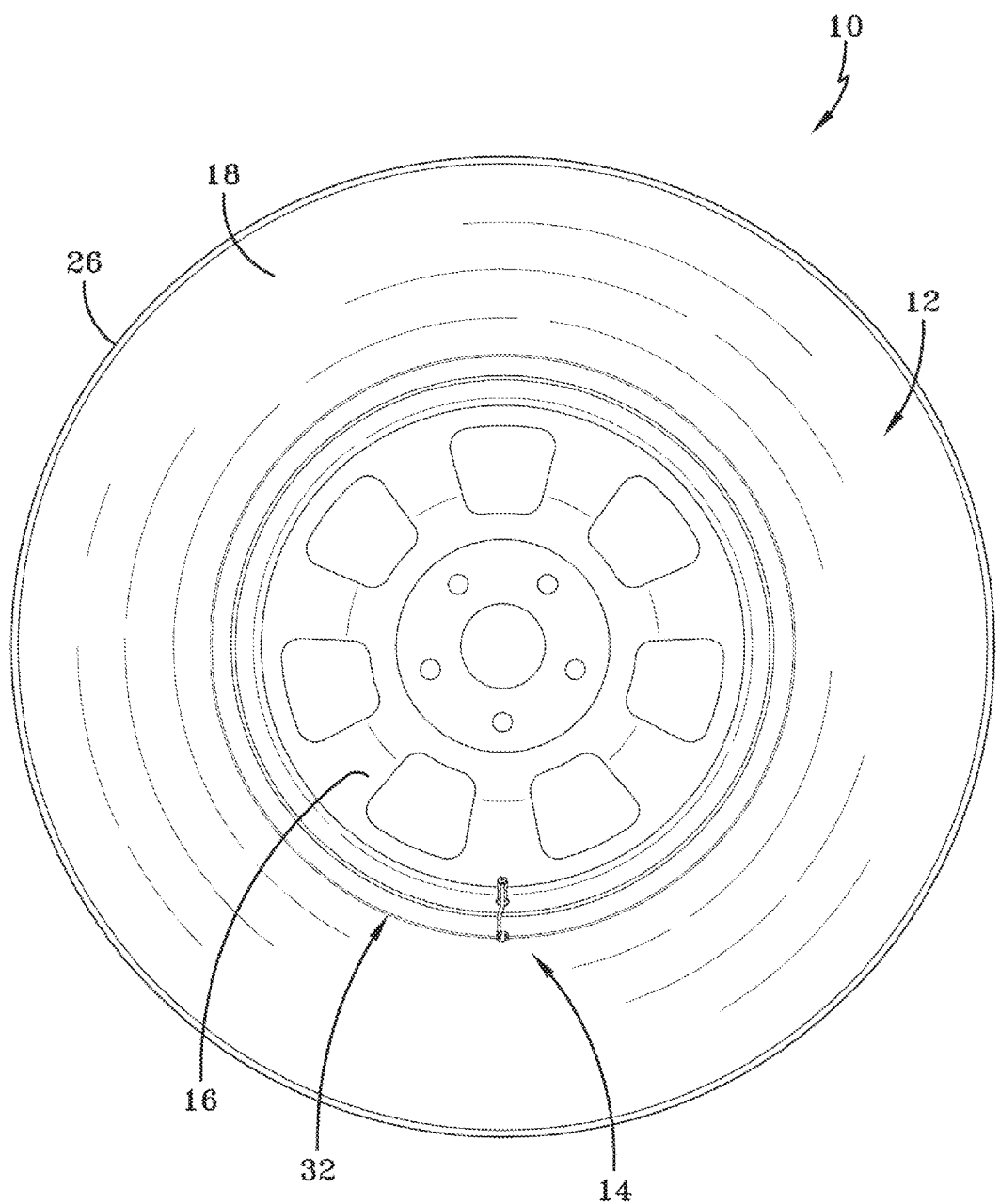
FIG. 2 is a side view of the tire of FIG. 1.
Figure 3:
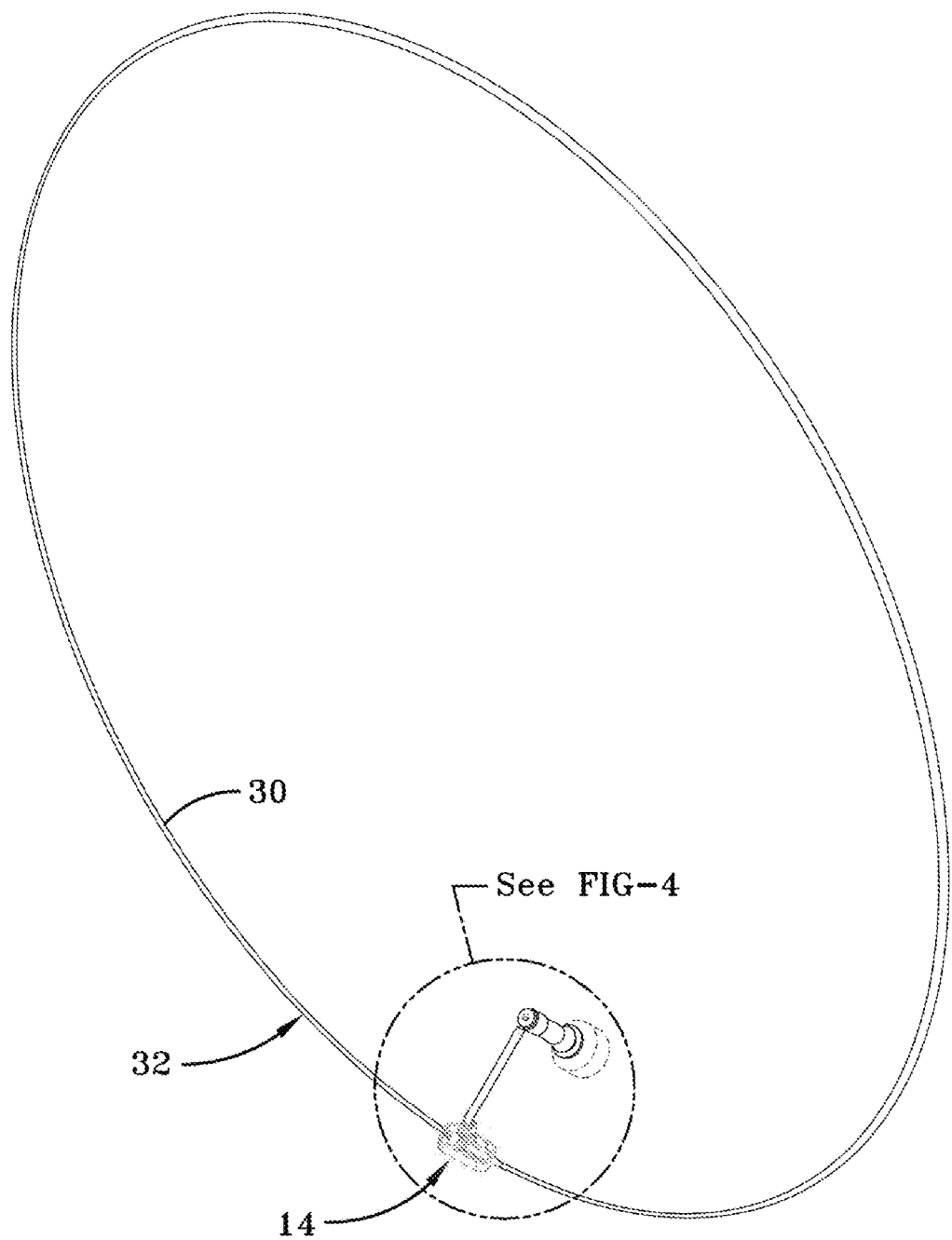
FIG. 3 is a perspective view showing an example pump sub-assembly, with the pump tube connection to AMT valve stem regulator within the tire cavity.

As seen from FIGS. 2 and 3, the peristaltic pump assembly 14 may include an annular air tube 30 that encloses an annular passageway 32. The tube 30 may be formed of a resilient, flexible material, such as plastic or rubber compounds that are capable of withstanding repeated deformation cycles of the tire 12. So constructed, part of the tube 30 may deform within a tire 12 into a flattened condition subject to external force and, upon removal of such force, return to an original unflattened condition. In the example shown, the cross-section of the tube 30 in an unstressed state may be generally circular, but other alternative tube geometries may be employed. The tube 30 may have a diameter sufficient to operatively pass a requisite volume of air sufficient for the purpose of pumping air into the tire cavity 28 to maintain the tire 12 at a preferred inflation pressure.

The peristaltic principles of incorporating a deformable air tube within a tire are shown and described in U.S. Pat. No. 9,272,586, incorporated herein by reference in its entirety. In the example assembly 10, the tube 30 may be incorporated within an annular tire passageway formed within the tire proximate a tire bead region. As the tire 12 rotates, air from outside the tire may be admitted into the tube 30 and pumped along the air tube by the progressive squeezing of the tube within the tire as the tire rotates. Air is thus forced into an outlet valve and then into the tire cavity to maintain air pressure within the tire cavity at a desired pressure level.

The tube 30 may mount closely within a groove in the tire and may sequentially flatten as the tire rotates. The segment by segment flattening of the tube 30 as the tire 12 rotates may operate to pump air along the air passageway 32, air which is then directed into the tire cavity 28 to maintain the desired pressure level. A peristaltic pumping system employing a tube within a sidewall groove is also shown in U.S. Pat. No. 8,042,586, incorporated herein by reference in its entirety.

The tube 30 may connect opposite ends 34, 36 over the tube ports of the transfer housing 38. The port 68 to a valve stem 78 from the transfer housing 38 may be connected to an end 72 of an elongate connecting tube 70. An opposite end 74 of the connecting tube 70 may attach to the valve stem 78 to a tire valve stem 80. Seated within the valve stem 78 may be a one-way check valve that opens and closes to admit air from the tube 30 into the tire valve stem 80.

Figure 4:
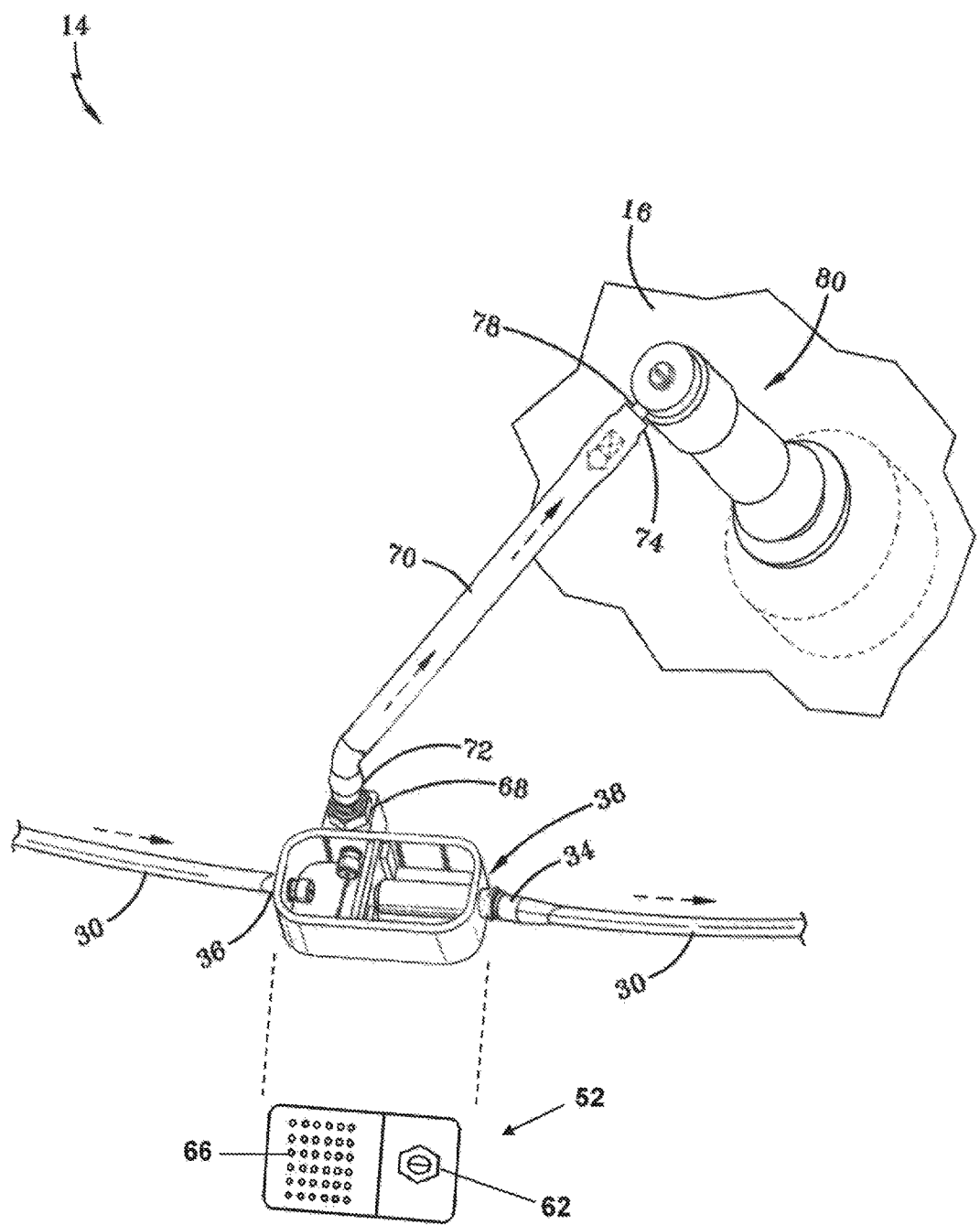
FIG. 4 is an enlarged fragmentary view taken from FIG. 3 showing a pump tube transfer housing and the tire AMT valve stem regulator within the tire cavity.

Referring to FIGS. 3, 4, and 5, the pump tube 30 may be generally annular and circumscribe a lower tire sidewall region proximate to a bead region of the tire 12. However, other configurations for the tube 30 may be devised. Opposite ends 34, 36 of the tube 30 may connect to a tube transfer housing 38. Frustro-conical tube ports may taper away from the tube housing 38, each having an internal axial air passageway, respectively, which provide air passages into the tube housing. The tube ports may taper inward to a remote end and be received within ends of the tube 30 to couple the tube to the tube housing 38. The tube housing 38 may have planar sides 50 defining a rectangular transfer housing internal chamber 48. The internal chamber 48 may be bifurcated into a tube transfer chamber 56 and a filter chamber 58 which may receive and house a porous filter component 60 therein.

A top panel 52 may enclose the chambers 56, 58. A relief valve 62 may be mounted to the top panel 52 and communicate with the transfer chamber 48. A one-way check valve may mount to the top panel 52 adjacent the relief valve 62 and be in air flow communication with the transfer chamber 48. An array of through-apertures 66 may extend through the top panel 52, disposed over the transfer chamber 48, to facilitate an inflow of ambient air into the filter 60 and then into the air tube 30. The one-way check valve may extend through the panel 52 to a tapered port 68 to the tire valve stem 80.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. An air maintenance tire assembly comprising:
a tire having a tire cavity bounded by first and second sidewalls extending to a tire tread region;
a pressure control assembly attached to an elongate valve stem projecting from a rim, the pressure control assembly being external to the tire cavity, the elongate valve stem projecting outward from the tire cavity and operative to admit pressurized air into the tire cavity through the pressure control assembly, the first sidewall having an annular sidewall air passageway therein operatively located to compress segment by segment responsive to a bending strain introduced into the first sidewall from a rolling tire footprint thereby forcing air, segment by segment, along the annular air passageway;
a tube housing joining ends of the annular air passageway; and
a connecting tube extending from the tube housing to the pressure control assembly, the connecting tube operative to sequentially direct air forced along the air passageway, first, into the tube housing, the pressure control assembly and, then, into the elongate valve stem as the tire rolls over a ground surface.

2. The air maintenance tire assembly set forth in claim 1 wherein the tube housing includes a plurality of planar sides defining an internal chamber.

3. The air maintenance tire assembly set forth in claim 2 wherein the internal chamber is bifurcated by an internal wall of the tube housing to define a first internal chamber and a second internal chamber.

4. The air maintenance tire assembly set forth in claim 1 wherein the pressure control assembly includes a relief valve for relieving pressure in the valve housing above a set pressure.

5. The air maintenance tire assembly set forth in claim 1 wherein the connecting tube is coupled in air flow communication with the air passageway and the valve stem.

6. The air maintenance tire assembly set forth in claim 1 further comprising a first valve for enabling and disabling a flow of pressurized air into the connecting tube from the air passageway.

7. The air maintenance tire assembly set forth in claim 6 wherein the first valve includes a one-way valve housed within the tube housing.

8. A method of maintaining air within a tire comprising the steps of:
positioning within a sidewall an annular air passageway, the tire having an elongate valve stem projecting outward from a tire cavity;
locating the annular air passageway to compress, segment by segment, responsive to a bending strain introduced into a sidewall from a rolling tire footprint of the tire thereby forcing air, segment by segment, along the annular air passageway; and
extending a connecting tube between a tube housing connecting ends of the annular air passageway and a pressure control assembly threadedly attached to the valve stem, the connecting tube and tube housing operative to sequentially direct air forced along the annular air passageway, first, into the pressure control assembly and then the valve stem and tire cavity as the tire rolls over a ground surface.

9. The method as set forth in claim 8 further comprising the step of:
deploying the annular air passageway as an air tube within a groove formed within the sidewall.

10. The method as set forth in claim 9 further comprising the steps of:
positioning a first valve operative to enable and disable a flow of pressurized air into the connecting tube from the tube housing; and
positioning a second valve operative to enable and disable a flow of pressurized air from the second valve into the tire cavity.

11. The method as set forth in claim 10 further comprising the steps of:
deploying the air tube and the sidewall groove in a substantially annular configuration; and
positioning the tube housing within the sidewall proximate to the valve stem.

12. The method as set forth in claim 8 further comprising the step of:
defining an internal chamber of the tube housing with a plurality of planar sides.

13. The method as set forth in claim 12 further comprising the steps of:
- bifurcating the internal chamber with an internal wall of the tube housing; and
- defining a first internal chamber and a second internal chamber.

\* \* \* \* \*